(12) United States Patent
Zou et al.

(10) Patent No.: US 11,340,253 B2
(45) Date of Patent: *May 24, 2022

(54) HIGH PERFORMANCE MICRO-ELECTRO-MECHANICAL SYSTEMS ACCELEROMETER WITH ELECTROSTATIC CONTROL OF PROOF MASS

(71) Applicant: Cambridge Enterprise Limited, Cambridgeshire (GB)

(72) Inventors: Xudong Zou, Beijing (CN); Ashwin Arunkuman Seshia, Cambridgeshire (GB)

(*) Notice: Subject to any disclaimer, the term of this patent is extended or adjusted under 35 U.S.C. 154(b) by 153 days.

This patent is subject to a terminal disclaimer.

(21) Appl. No.: 16/608,305

(22) PCT Filed: Apr. 24, 2018

(86) PCT No.: PCT/GB2018/051071
§ 371 (c)(1),
(2) Date: Oct. 25, 2019

(87) PCT Pub. No.: WO2018/197860
PCT Pub. Date: Nov. 1, 2018

(65) Prior Publication Data
US 2020/0096536 A1      Mar. 26, 2020

(30) Foreign Application Priority Data

Apr. 27, 2017  (GB) ..................... 1706740

(51) Int. Cl.
*G01P 15/097* (2006.01)
*G01P 1/00* (2006.01)
*G01P 15/08* (2006.01)

(52) U.S. Cl.
CPC ............ *G01P 15/097* (2013.01); *G01P 1/003* (2013.01); *G01P 15/0802* (2013.01)

(58) Field of Classification Search
CPC .... G01P 15/097; G01P 15/0802; G01P 15/13; G01P 15/131; G01P 1/003;
(Continued)

(56) References Cited

U.S. PATENT DOCUMENTS 2,873,426 A    2/1959  Dranetz
5,417,115 A *  5/1995  Burns ..................... G01L 1/183
                                                  331/156

(Continued)

FOREIGN PATENT DOCUMENTS

CN    102 608 355 A    7/2012
EP    2267461 A1       12/2010
(Continued)

OTHER PUBLICATIONS

Zou et al., "A High Resolution Resonant MEMS Accelerometer," Nanoscience Centre, Department of Engineering, University of Cambridge, U.K.; Jun. 21-25, 2015; 4 pages. Jun. 21, 2015.

(Continued)

*Primary Examiner* — Helen C Kwok
(74) *Attorney, Agent, or Firm* — Todd A. Serbin; Nexsen Pruet, LLC

(57) ABSTRACT

There is provided a resonant sensor comprising: a substrate; a proof mass suspended from the substrate to allow for relative movement between the proof mass and the substrate along at least one sensitive axis; at least one resonant element coupled to the proof mass; an electrode assembly adjacent to the at least one resonant element; drive and sense circuitry connected to the electrode assembly configured to drive the electrode assembly to cause the at least one resonant element to resonate, wherein a measure of acceleration of the proof mass can be determined from changes in the resonant behavior of the at least one resonant element; at least one substrate electrode on the substrate, adjacent to the (Continued)

proof mass; and electric circuitry connected to the substrate electrode configured to apply a voltage to the substrate electrode providing an electrostatic force on the proof mass. The substrate electrode may be used to provide a number of different functions.

20 Claims, 7 Drawing Sheets

(58) Field of Classification Search
CPC ............ G01C 19/5712; G01C 19/5719; G01C 19/5755; G01C 19/5726
See application file for complete search history.

(56) References Cited

U.S. PATENT DOCUMENTS

| | | | |
|---|---|---|---|
| 5,911,156 A * | 6/1999 | Ward | G01C 19/5719 73/504.16 |
| 6,032,531 A | 3/2000 | Roszhart | |
| 9,310,391 B2 | 4/2016 | Seshia et al. | |
| 9,551,576 B2 | 1/2017 | Thiruvenkatanathan et al. | |
| 2004/0226370 A1 | 11/2004 | Hayworth et al. | |
| 2007/0222011 A1 | 9/2007 | Robert et al. | |
| 2009/0194830 A1 | 8/2009 | Ransley et al. | |
| 2010/0181156 A1 * | 7/2010 | Quer | G01P 15/097 188/378 |
| 2013/0204571 A1 * | 8/2013 | Savchenko | G01P 15/097 702/141 |
| 2013/0298670 A1 * | 11/2013 | Tsugai | G01C 19/5705 73/504.12 |
| 2013/0298675 A1 * | 11/2013 | Thiruvenkatanathan | G01C 19/5755 73/504.16 |
| 2015/0226762 A1 * | 8/2015 | Seshia | G01P 15/097 73/495 |
| 2018/0209791 A1 * | 7/2018 | Chang | G01C 19/5747 |
| 2019/0301870 A1 | 10/2019 | Seshia et al. | |
| 2020/0124634 A1 * | 4/2020 | Seshia | G01P 21/00 |
| 2020/0166537 A1 * | 5/2020 | Zou | G01P 15/0802 |

FOREIGN PATENT DOCUMENTS

| | | |
|---|---|---|
| EP | 3147674 A1 | 3/2017 |
| WO | 98/37380 A1 | 8/1998 |
| WO | 2006/009578 A2 | 1/2006 |
| WO | 2011143137 A1 | 12/2011 |
| WO | 2014001634 A1 | 1/2014 |

OTHER PUBLICATIONS

Etienne, Athina Nickitas; PCT/GB2018/051071; International Preliminary Report on Patentability; 12 pages; dated Nov. 7, 2019.
Xudong, Zou, "High Resolution Resonant Accelerometer Based on MEMS Technology," University of Cambridge; Nov. 2013; 279 pages.
Zou et al., "A high-resolution micro-electro-mechanical resonant tilt sensor," Sensors and Actuators A: 220 (2014) 168-177; www.elsevier.com/locate/sna; 2014; 10 pages.
Zou et al., "A Seismic-Grade Resonant MEMS Accelerometer," Journal of Microelectromechanical Systems, vol. 23, No. 4, Aug. 2014; 3 pages.
Amendment to UK Intellectual Property Office Search Report dated Nov. 22, 2018 in GB 1706740.6 (1 page).
International Search Report dated Jul. 6, 2018 in PCT/GB2018/051071 (5 pages).
Seshia et al., U.S. Appl. No. 16/481,660, filed Jul. 29, 2019.
UK Intellectual Property Office Search Report dated Oct. 30, 2017 in GB 1706740.6 (3 pages).
Written Opinion dated Jul. 6, 2018 in PCT/GB2018/051071 (10 pages).

* cited by examiner

HIGH PERFORMANCE MICRO-ELECTRO-MECHANICAL SYSTEMS ACCELEROMETER WITH ELECTROSTATIC CONTROL OF PROOF MASS

CROSS REFERENCE TO RELATED APPLICATIONS

This application is a 35 U.S.C. § 371 U.S. national phase entry of International Application No. PCT/GB2018/051071 having an international filing date of Apr. 24, 2018, which claims the benefit of GB Application No. 1706740.6 filed Apr. 27, 2017, each of which is incorporated herein by reference in its entirety.

BACKGROUND

The present invention relates to micro-electro-mechanical systems (MEMS) accelerometers, and in particular to high performance accelerometers capable of providing a high resolution measurement of acceleration suitable for low-frequency or quasi static accelerations.

Oscillators based on lightly damped microscopic mechanical resonators are well known for their ability to produce stable, low-noise frequency outputs. While these characteristics make them valuable in communication systems as stable timing/frequency references, they also make them attractive for use as sensors. A resonant sensor, by definition, is an oscillator whose output frequency is a function of an input measurand. In other words, the output of a resonant sensor corresponds to the shift in resonant frequency of a mechanical microstructure that gets tuned in accordance to a change in a physical/chemical quantity to be measured. The quasi-digital nature of the output signal in such sensors, along with the sensitivity and stability of the frequency shifted output signals, have resulted in wide spread use of such micromachined resonant sensors for numerous applications ranging from bio-molecular and chemical diagnostics, to high-precision force, mass, strain and even charge sensing.

However, for some applications it would be desirable to provide a resonant sensor design with even greater sensitivity and stability. One such application is for measuring specific gravity, where acceleration measurements need to be very stable.

SUMMARY

In a first aspect of the invention, there is provided a resonant sensor comprising:
a substrate;
a proof mass suspended from the substrate to allow for relative movement between the proof mass and the substrate along at least one sensitive axis;
at least one resonant element coupled to the proof mass;
an electrode assembly adjacent to the at least one resonant element;
drive and sense circuitry connected to the electrode assembly configured to drive the electrode assembly to cause the at least one resonant element to resonate, wherein a measure of acceleration of the proof mass can be determined from changes in the resonant behavior of the at least one resonant element;
at least one substrate electrode on the substrate, adjacent to the proof mass; and
electric circuitry connected to the substrate electrode configured to apply a voltage to the substrate electrode providing an electrostatic force on the proof mass.

The substrate electrode may be used to provide a number of different functions.

The electric circuitry may be configured to apply an alternating calibration signal to the substrate electrode to drive the proof mass at a calibration frequency, or range of calibration frequencies, and the drive and sense circuitry configured to use the response of the resonant element to the calibration signal to calibrate the resonant sensor. Preferably, the calibration frequency or range of calibration frequencies is lower than the fundamental resonant frequency of the at least one resonant element. Calibration may be carried out separately for different resonant modes of operation of the resonant sensor.

The calibration frequency or range of calibration frequencies may be chosen to be higher than the frequency of typical variations in a measurand of interest, such as specific gravity. The response of the sensor to the calibration signal can then be extracted using a high pass filter or other spectral analysis tool. This allows calibration to be performed even during use of the sensor. Periodic calibration of the sensor can be carried out automatically. Periodic calibration allows for compensation of temperature variance induced scale factor drift.

Calibration of the resonant sensor comprises calculating a scale factor of the resonant sensor. The scale factor is the amount of frequency shift of the resonant frequency of the resonant element that occurs for a given acceleration of the proof mass. Calibration may be carried out separately for different resonant modes of operation of the resonant sensor as different resonant modes may give rise to different scale factors.

The electric circuitry may be configured to apply a DC biasing voltage to the substrate electrode. A DC biasing voltage may pre-stress the resonant elements. This can improve the acceleration sensitivity of the sensor and reduce temperature sensitivity, at the cost of reduced dynamic range.

The resonant sensor may further comprise at least one additional electrode on the substrate, adjacent to the proof mass, wherein the electric circuitry is configured to apply a damping signal to the substrate electrode or the at least one additional electrode. This allows the proof mass to be quickly brought back to rest following a shock, so that further measurements can be made.

In one embodiment, the additional electrode is a sensing electrode configured to sense motion of the proof mass. A sense signal from the sensing electrode may be used to generate a damping signal out of phase with the sense signal. The substrate electrode may be an actuation electrode. The damping signal may be applied to the substrate electrode to retard the motion of the proof mass. The sensing and substrate electrodes may be connected through a closed-loop feedback control circuit.

The resonant sensor may further comprise one or more proof mass electrodes on the proof mass. The proof mass electrodes may be positioned adjacent the one or more substrate electrodes and one or more additional electrodes. The substrate electrode may be a comb electrode and may interact with a corresponding comb proof mass electrode.

The resonant sensor may be a MEMS device. The proof mass, substrate and resonant element may be formed from silicon. The resonant sensor may be a single axis gravity sensor.

The resonant element may comprise a plurality of resonant elements coupled to the proof mass. The output of the sensor may be based on a sum or difference between outputs from each of the plurality of resonant elements. The resonant sensor may also comprise a plurality of proof masses. The resonant sensor may comprise one or more levers connected between the resonant element and the proof mass. The one or more levers may amplify the force applied to the resonant element as a result of displacement of the proof mass.

In a second aspect of the invention, there is provided a method of calibrating a resonant sensor, the resonant sensor comprising a substrate, a proof mass suspended from the substrate to allow for relative movement between the proof mass and the substrate along at least one sensitive axis, at least one resonant element coupled to the proof mass, an electrode assembly adjacent to the at least one resonant element, drive and sense circuitry connected to the electrode assembly configured to drive the electrode assembly to cause the at least one resonant element to resonate, and a calibration electrode on the substrate, adjacent to the proof mass, wherein a measure of acceleration of the proof mass can be determined from changes in the resonant behavior of the at least one resonant element; the method comprising:

applying an alternating calibration signal to the calibration electrode to drive the proof mass at a calibration frequency or a plurality of calibration frequencies, measuring the response of the resonant element to the calibration signal, and calibrating the resonant sensor based on the response of the resonant element to the calibration signal.

The step of measuring the response of the resonant element may comprise recording a maximum frequency shift of a resonant frequency of the resonant element in response to the calibration signal.

Preferably, the calibration frequency or range of calibration frequencies is lower than the fundamental resonant frequency of the at least one resonant element. Calibration may be carried out separately for different resonant modes of operation of the resonant sensor.

The calibration frequency or calibration frequencies may be chosen to be higher than the frequency of typical variations in a measurand of interest, such as specific gravity. The response of the sensor to the calibration signal can then be extracted using a high pass filter or other spectral analysis tool. This allows calibration to be performed even during use of the sensor. Periodic calibration of the sensor can be carried out automatically. This allows for compensation of temperature variance induced scale factor drift.

The method may further comprise applying a drive signal to the electrode assembly to cause the at least one resonant element to resonate in a resonant mode concurrently with the steps of applying an alternating calibration signal, measuring the response and calibrating the resonant sensor.

The step of calibrating the resonant sensor may comprise calculating a scale factor of the sensor. The scale factor is the amount of frequency shift of the resonant frequency of the resonant element that occurs for a given acceleration of the proof mass. The step of calibrating may be carried out separately for different resonant modes of operation of the resonant sensor.

The method may further comprise applying a DC bias voltage to the calibration electrode to stress the resonant element concurrently with the steps of applying an alternating calibration signal, measuring the response and calibrating the resonant sensor.

In third aspect of the invention, there is provided a method of operating a resonant sensor, the resonant comprising a substrate, a proof mass suspended from the substrate to allow for relative movement between the proof mass and the substrate along at least one sensitive axis, at least one resonant element coupled to the proof mass, an electrode assembly adjacent to the at least one resonant element, drive and sense circuitry connected to the electrode assembly configured to drive the electrode assembly to cause the at least one resonant element to resonate, and a biasing electrode on the substrate, adjacent to the proof mass, wherein a measure of acceleration of the proof mass can be determined from changes in the resonant behavior of the at least one resonant element; the method comprising:

applying a DC bias voltage to the biasing electrode to stress the resonant element, and applying an AC drive voltage to the electrode assembly to drive the resonant element at a resonant frequency.

Applying a DC bias voltage to stress the resonant element may make the resonant sensor less sensitive to temperature variations. The resonant sensor may also have an increased scale factor over a smaller dynamic range as a result of stressing the resonant element.

In a fourth aspect of the invention, there is provided a method of operating a resonant sensor, the resonant sensor comprising a substrate, a proof mass suspended from the substrate to allow for relative movement between the proof mass and the substrate along at least one sensitive axis, at least one resonant element coupled to the proof mass, an electrode assembly adjacent to the at least one resonant element, drive and sense circuitry connected to the electrode assembly configured to drive the electrode assembly to cause the at least one resonant element to resonate, and at least one detection electrode on the substrate, adjacent to the proof mass and at least one damping electrode on the substrate adjacent to the proof mass, wherein a measure of acceleration of the proof mass can be determined from changes in the resonant behavior of the at least one resonant element; the method comprising:

measuring the motion of the proof mass based on a signal from the at least one detection electrode to provide a detection signal, and applying a damping signal to the at least one damping electrode, the damping signal being generated based on the detection signal.

Advantageously, the damping signal is out of phase with the detection signal. The damping signal may have a progressively reducing amplitude. The detection and damping electrodes may be connected through a closed-loop feedback control circuit.

The damping signal retards the motion of the proof mass reducing the settling time of the proof mass. If the proof mass can be quickly brought back to rest following a shock, further measurements can be made more quickly, improving the effectiveness of the sensor.

The method may further comprise the step of comparing an amplitude of the detection signal with a threshold and the step of applying a damping signal may be performed only when the amplitude of the detection signal exceeds the threshold.

Features described in relation to one aspect of the invention may be applied to other aspects of the invention. The provision of electrodes on the substrate adjacent to the proof mass allows for automatic sensor testing and calibration to be performed without the need to place the sensor on a separate inertial platform. By applying DC and AC signals to the substrate electrode or electrodes, properties of the resonant sensor can be tested, such as the scale factor, linear dynamic range and bandwidth.

DRAWINGS

DESCRIPTION

Figure 1:
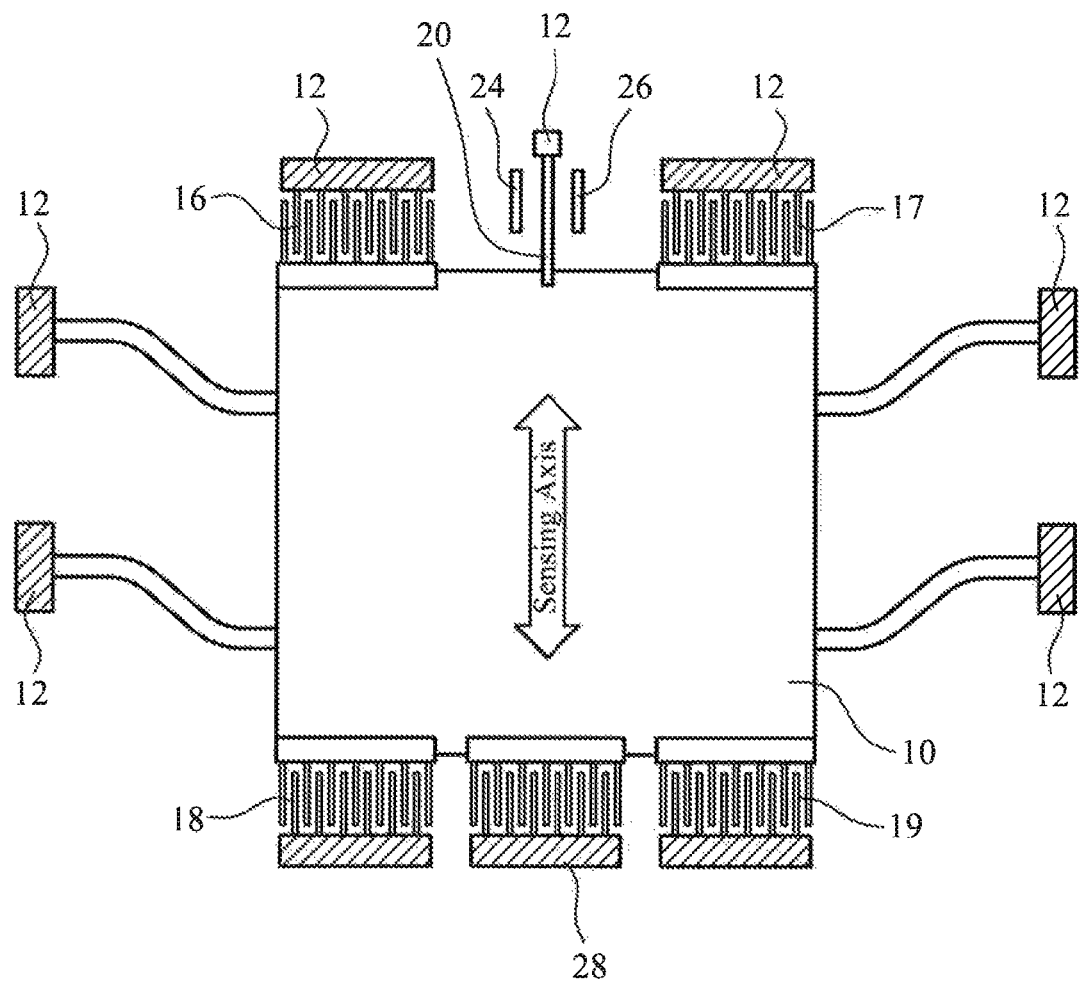
FIG. 1 is a schematic illustration of an accelerometer in accordance with a first embodiment of the invention.

FIG. 1 is a schematic illustration of an accelerometer in accordance with a first embodiment of the invention. The accelerometer is a MEMS device formed from a single crystal of silicon. The accelerometer comprises a proof mass 10 suspended from a surrounding frame or substrate 12 by a plurality of flexures 14. A first resonant element 20 is connected to one side of the proof mass 10 through amplifying lever 16. In operation, the resonant element 20 is driven to resonance by the application of an alternating current to electrodes 24 adjacent to the resonant element.

The accelerometer is sensitive to acceleration along a sensitive axis, illustrated by arrow 28. The resonant element experiences a force as a result of acceleration of the proof mass along the sensitive axis. Amplifying lever 16, also referred to as a microlever, amplifies the inertial force applied to the resonant element as a result of displacement of the proof mass 25 along the sensitive axis. Any acceleration of the proof mass along the sensitive axis consequently gets translated into a strain on the resonant element. Consequently, the induced strain on the resonant element results in a shift of its resonant frequency.

The accelerometer of FIG. 1 also comprises five sets of interdigitated comb electrode sets 16, 17, 18, 19 and 28. The comb electrode sets each comprise a first electrode fixed to the substrate 12 and a second electrode fixed to the proof mass. The electrodes comprise a plurality of tines which are aligned with the sensitive axis of the accelerometer and a=interdigitate with one another. The function of these electrodes are described below.

Electrode sets 16, 17, 18, 19 comprise actuation electrodes on the substrate used to apply a force to the proof mass and electrode set 28 comprises a sensing electrode on the substrate used to sense the motion of the proof mass.

Figure 2:
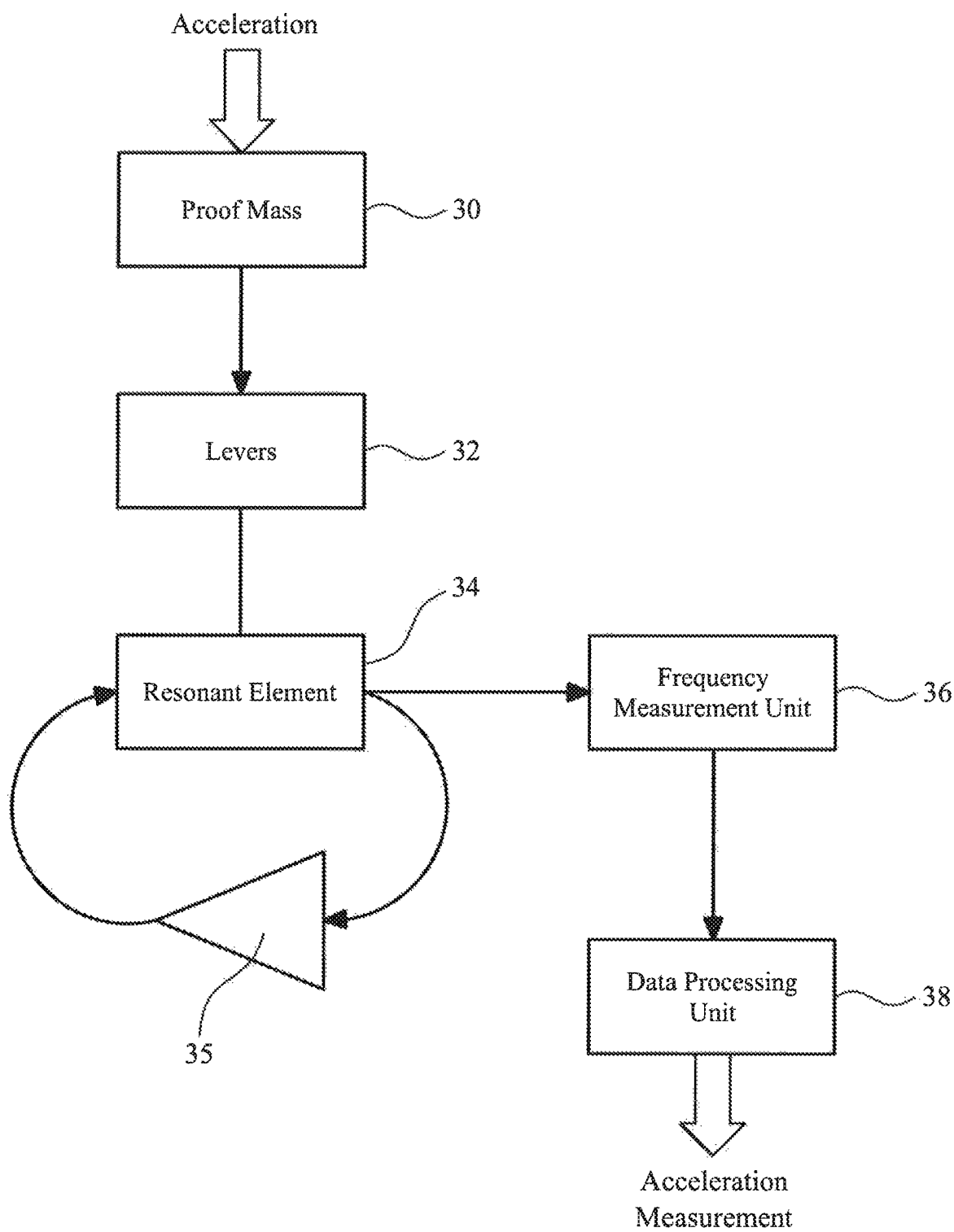
FIG. 2 is a schematic illustration of the principle of operation of a resonant accelerometer.

FIG. 2 is a schematic illustration of the basic elements and principle of operation of the resonant accelerometer shown in FIG. 1. An acceleration acts on the proof mass 30 to generate an inertial force on the sensing axis. The inertial force is amplified by the microlever 32 to act on the resonant element 34. A feedback loop, including amplifier 35 is used to maintain the resonant element at a resonant frequency. Any change in resonant frequency is measured by frequency measurement unit 36 and processed using a data processing unit 38 to provide an output measured acceleration signal.

Figure 3:
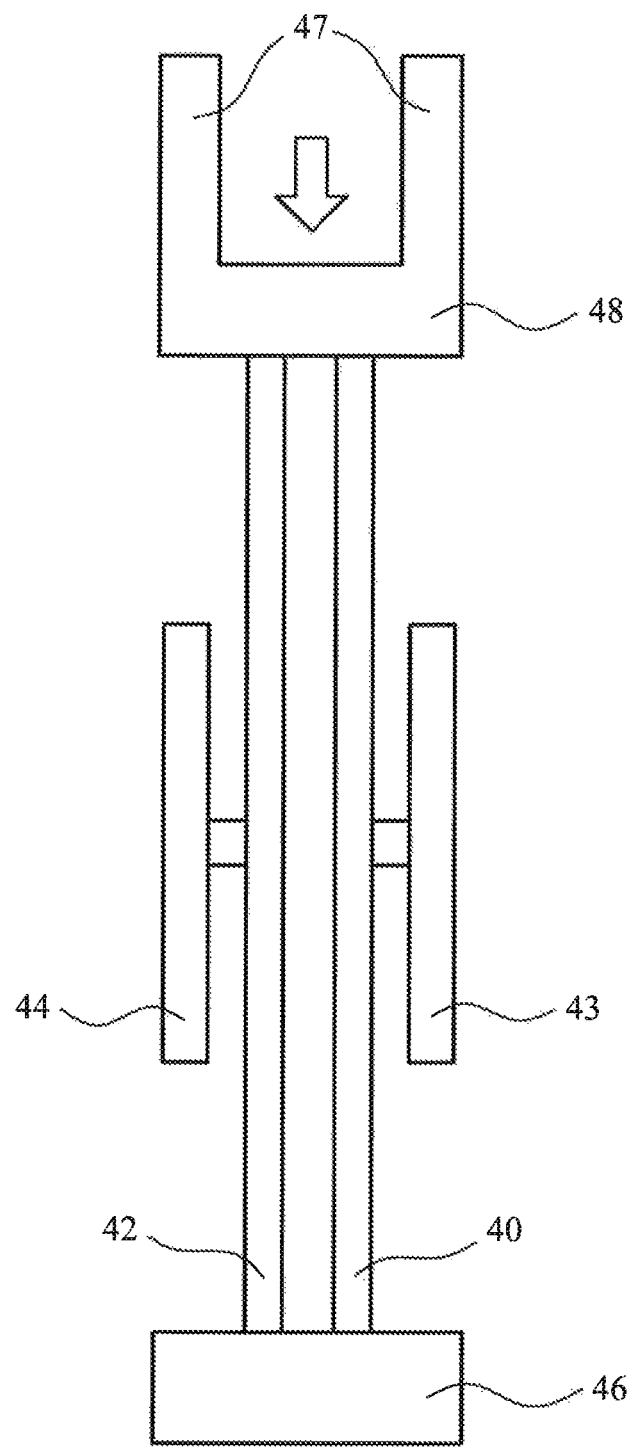
FIG. 3 is a schematic illustration of an example of a resonant element for use in the accelerometer of FIG. 2.

FIG. 3 illustrates one possible design for the resonant element. The resonant element is double-ended tuning fork (DETF) resonator. The resonant element comprises first and second tines 40, 42 connected between a fixed anchor 46 on the frame and a floating anchor 48 which is connected to the proof mass through the microlever. Elements 47 are connections to the amplifying microlever. First and second electrodes 43, 44 are connected to the first and second tines 40, 42 and are used to drive and sense the motion of the tines.

The flexures that are used to suspend the proof mass from the frame may be single beam flexures. This offers good cross-axis decoupling of the acceleration. However the stiffness of a single beam flexures is not constant but increases with increasing displacement due to stress concentration with the beam (the spring hardening effect). This means that the displacement of the proof mass will not be linear with increasing acceleration and the inertial force on the resonant elements will be relatively reduces at large displacements. To improve the sensitivity of the sensor the flexures folded beams can be used. However conventional folded beam designs do not have good cross-axis decoupling, making them undesirable for a single axis accelerometer. So to improve sensitivity of the accelerometer is advantageous to use serpentine flexures to suspend the proof mass from the frame. A serpentine shape can minimize the spring hardening effect but still maintain good cross-axis decoupling.

Figure 4:
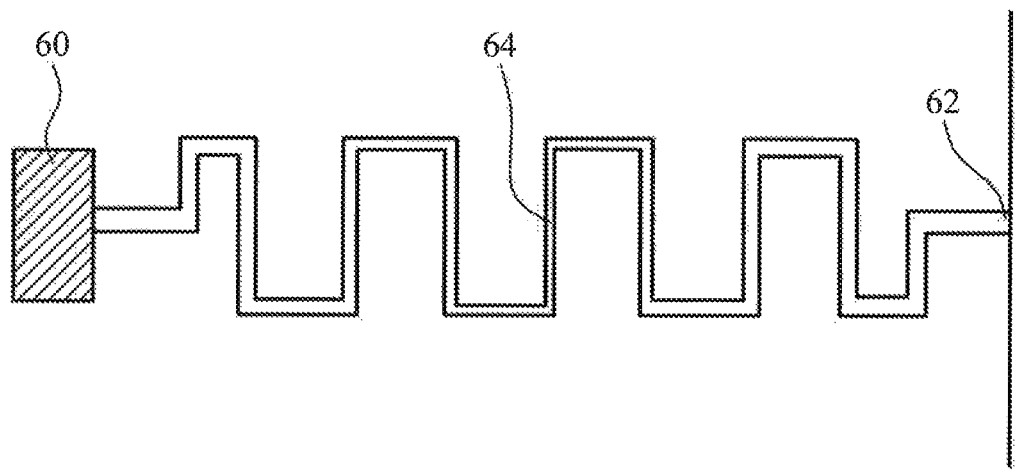
FIG. 4 is a schematic illustration of a serpentine flexure.

FIG. 4 illustrates a serpentine flexure. The flexure has a first end 60, which may be fixed to the proof mass, and a second end 62, which may be connected to the frame. The flexure consists of a number of short beam segments connecting as a snake shape. The width of each beam segment is continuously reducing from the two fixed ends 60, 62 to the central portion 64 to effectively redistribute the stress along the whole suspension under transverse load. This results in more even stress distribution on the flexure compared to the single beam suspension under the same load. Also, if the length of each beam segment is short, the "snake shape" maintains the good cross-axis decoupling 5 effectiveness. In the example shown in FIG. 4, the beam width is 51 μm at the fixed ends 60, 62 and reduces to 2 μm in the central region 64. The length of each beam segment increases towards the central region, with the length of the segments at the fixed ends being 20 μm and increasing to 40 μm in the central region. The interior corners of the serpentine flexure are also filleted to reduce concentration of stress at the corners. In order to further improve cross-axis decoupling, a link beam may be added between the proof mass and a main beam of the or each microlever, extending parallel to the sensitive axis. The link beam may be located close to the input beam connecting the main beam of the microlever to the proof mass.

Figure 5A:
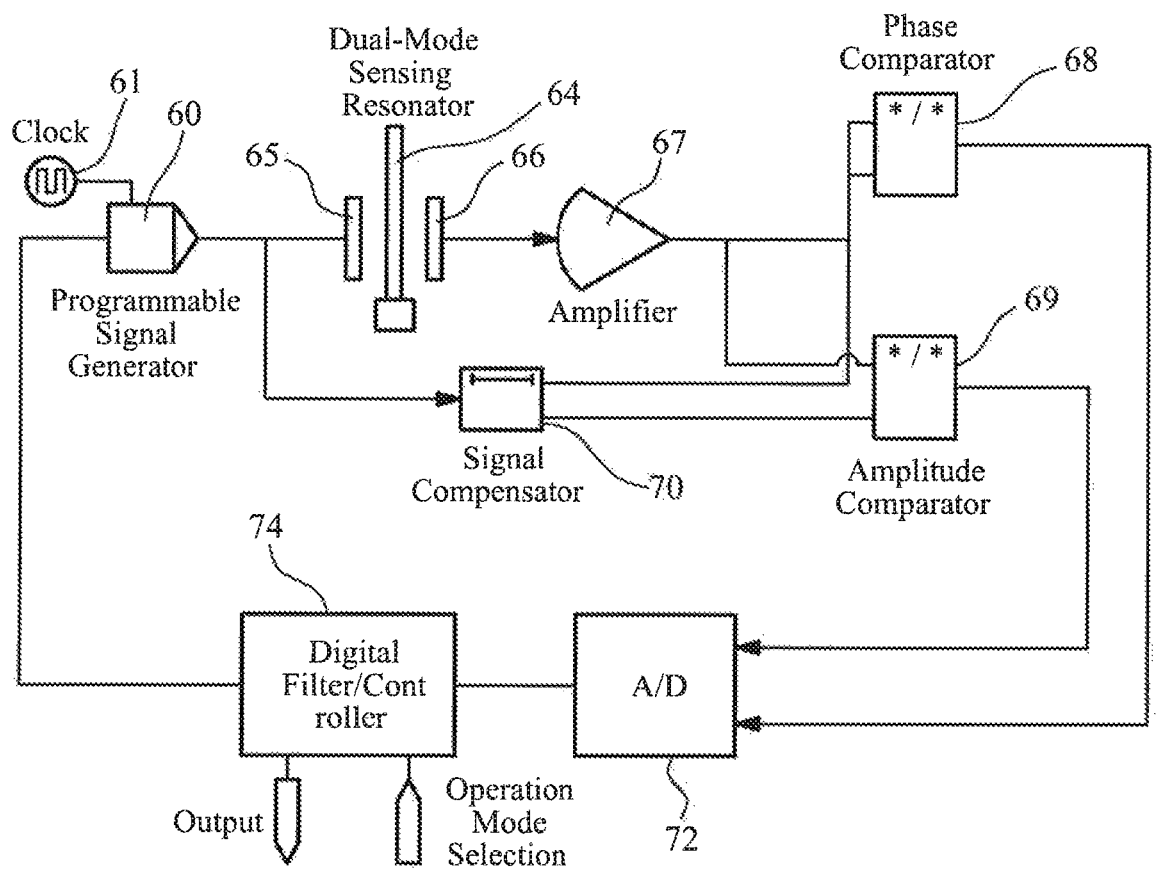
FIG. 5a is an illustration of one drive and sensing circuit for use with the accelerometer of FIG. 1.

In order to drive the resonant element in a particular resonant mode and detect changes in resonant frequency, drive and sense circuitry is required. FIG. 5A illustrates a first example of a drive and measurement circuit, which can be used for the resonant element.

The circuit comprises a variable frequency signal source 60. The variable frequency signal source in this embodiment comprises a direct digital synthesizer (DDS) chip. The variable frequency signal source in this embodiment comprises a local oscillator as a reference clock signal 61. The variable frequency signal source is connected to a first port of the resonant sensor 64, which is a first electrode 65 adjacent to one of the resonant elements. The response or output from the sensor can be read from a second electrode 66 adjacent the resonant element.

The system comprises an amplifier 67, to which the second electrode 66 is connected. An output of the amplifier is connected to a phase comparator 68.

A signal compensator 70 is connected between the variable frequency signal source 60 and the phase comparator 68. The signal compensator 70 introduces a phase shift that compensates for phase shifts that arise in the signal path through the resonant sensor and to the phase comparator. The amount of phase shift can be calibrated in a set up procedure.

The phase comparator 68 compares the phase of the signal from the amplifier 67 and the signal compensator. The output of the phase comparator is a quasi-DC voltage output proportional to the relative phase difference. This relative phase difference is indicative of a difference between the frequency of the input signal and the resonant frequency of the resonant sensor in the existing conditions. The resonant frequency of the resonant sensor is dependent on the input acceleration.

The circuit comprises an analogue-to-digital convertor (ADC) 72 to convert the output from the phase comparator to a digital signal suitable for the microcontroller 74.

The microcontroller 74 receives the signal from the ADC 72. The value of the signal from the ADC is indicative of how close the frequency of the signal from the variable frequency signal source is to the resonant frequency of the resonant sensor. The microcontroller 74 is connected to the variable frequency signal source. In a closed loop mode, signals from the microcontroller are used to change the frequency of the input signals generated by the variable frequency signal source. Shifts in the resonant frequency of the resonant sensor provide a measure of a change in acceleration.

The circuit of FIG. 5A also includes an amplitude comparator connected to both the amplifier 67 and the signal compensator 70. The output of the amplitude comparator is input to the ADC 72 and then to the microcontroller 74. The output from the amplitude comparator may be used when the resonant sensor has an amplitude response indicative of the input measurand. For example, the resonant sensor may be a mode-localization sensor comprising two weakly coupled resonant elements, one of which is exposed to the inertial force resulting from an acceleration, as will be described with reference to FIG. 7, in which the amplitude ratio between the output of the resonant sensor and second input signal is indicative of the input measurand.

The circuit shown in FIG. 6A can operate in closed loop and open loop modes. In closed loop mode, the frequency of the input signals is adjusted based on instructions from the microcontroller in order to synchronize with the resonant frequency of the resonant sensor. In the open loop mode, the microcontroller does not feedback to the variable frequency signal source. Instead, the frequency of the input signal is fixed and a measurement is taken by the microcontroller. Initially, the system operates in the closed loop mode to fix onto a resonant frequency for the mode of choice. The open loop mode can then be use to provide a high sensitivity measurement.

Figure 5B:
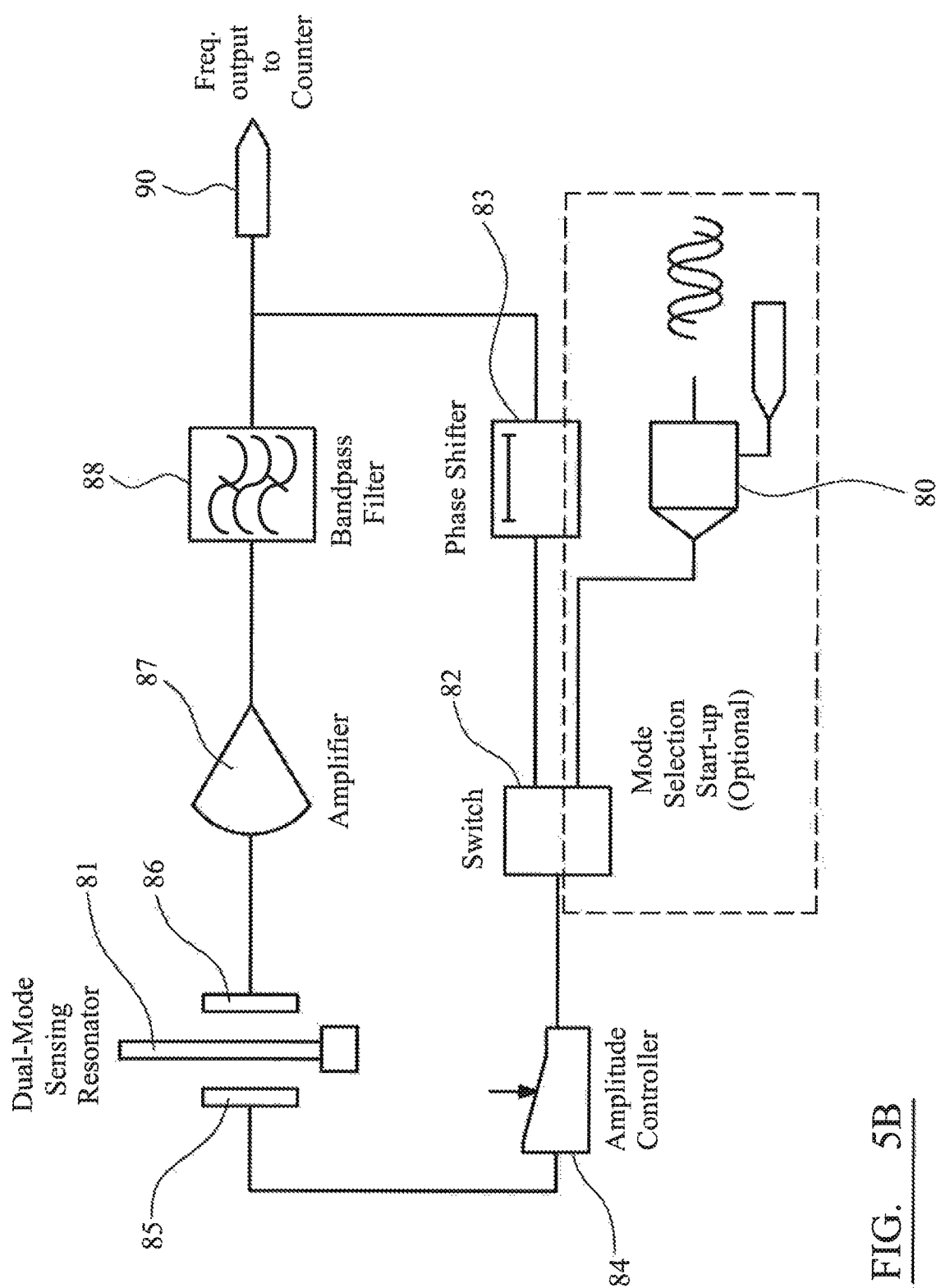
FIG. 5b is an illustration of another drive and sensing circuit for use with the accelerometer of FIG. 2.

FIG. 5B is an alternative drive and sense circuit, which is essentially an oscillator circuit. In the circuit of FIG. 5B a variable frequency signal source 80 is provide an initial signal, the frequency of which selects a mode of vibration for the resonant element. The output of the variable frequency signal source 80 is applied to the drive electrode 85 through an amplitude controller 84 which may be a variable voltage divider. The output of the resonant sensor from electrode 86 is input to an amplifier 87 and then through a bandpass filter 88. The output of the bandpass filter is the circuit output which may be sent to a frequency counter to determine changes in the resonant frequency of the resonant element. The output of the bandpass filter is fed back to the input electrode 85 through a phase shifter 83 and the amplitude controller 84 to lock on to a resonant frequency of the resonant element. Switch 82 is provided so that the input to the input electrode 85 can be switched from the variable frequency signal source 80 to the feedback signal from the phase shifter 83 once oscillation of the resonant element has been established.

In order to obtain meaningful measurements from an accelerometer of the type shown in FIG. 1, it is necessary to calibrate the accelerometer. In particular it is necessary to know by how much the resonant frequency of the resonant element, oscillating in a particular resonant mode, will shift for a given acceleration of the proof mass. This is referred to as the scale factor of the accelerometer.

Figure 6:
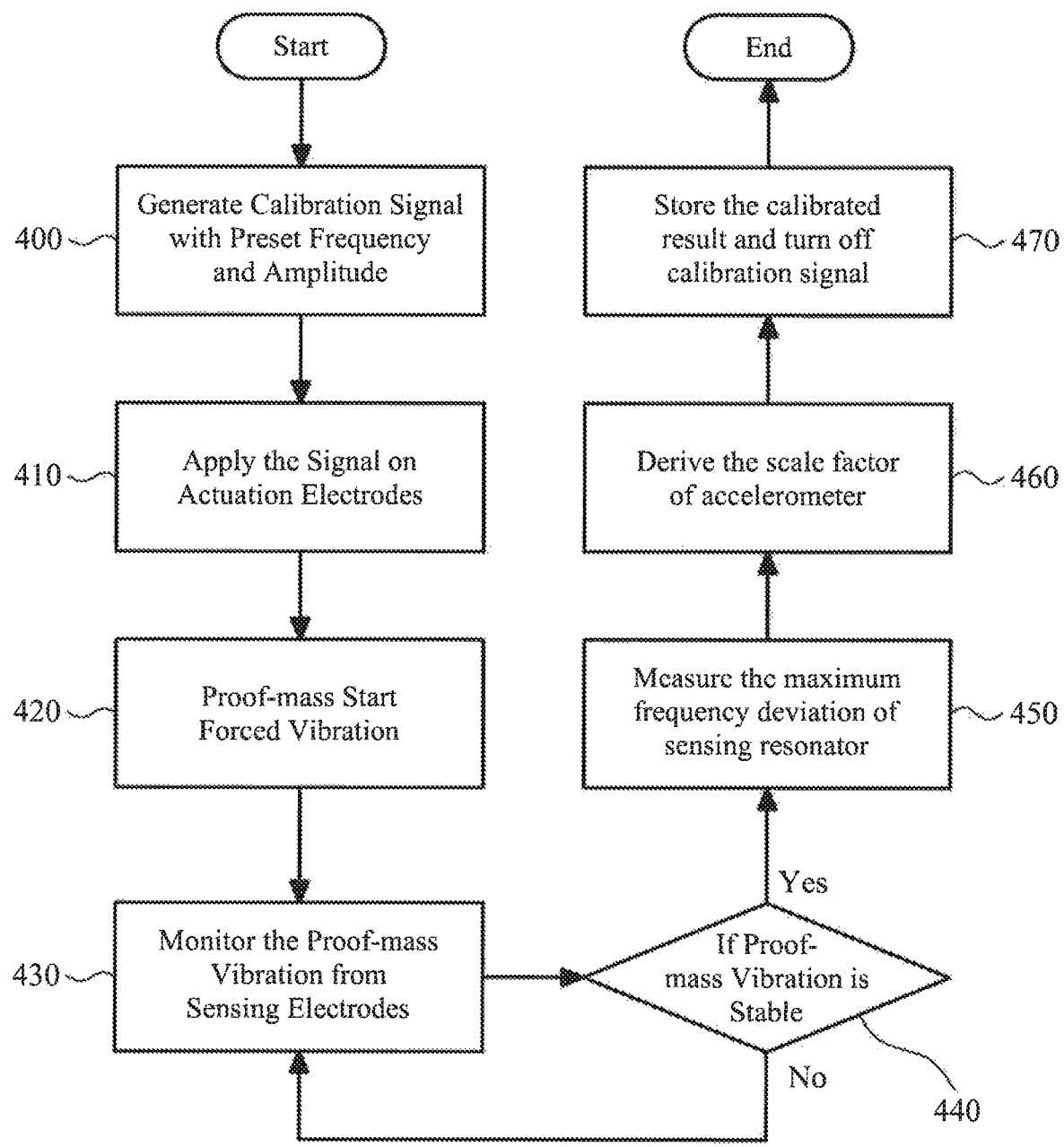
FIG. 6 illustrates an auto-calibration process using the arrangement of electrodes shown in FIG. 1.

The actuation electrodes 16, 17, 18, and 19 can be used for this purpose as they allow a known force to be applied to the proof mass. FIG. 6 is a flow diagram illustrating a calibration process for the accelerometer of FIG. 1. In a first step 400 a calibration signal of a predetermined frequency and amplitude is generated. At the same time a drive signal is applied to the drive electrode 24 adjacent the resonant element 20 to maintain the resonant element at resonance. The frequency of the calibration signal is chosen to be lower than the resonant frequency of the resonant element. In step 410 the calibration signal is applied to the actuation electrodes. The varying potential difference between the tines of the actuation electrodes results in an oscillating force being applied to the proof mass so that the proof mass begins to vibrate along the sensitive axis. This is shown as step 420. Before measuring the response of the resonant element to the displacement of the proof mass, the sensing electrode 28 is used to determine if the vibration of the proof mass is stable. In steps 430 and 440 an output from the sensing electrode 28 is monitored. Only when the output from the sensing electrode has a substantially constant amplitude and frequency does the process proceed to step 450. In step 450 the maximum shift in resonant frequency of the resonant element is determined over a number of cycles of oscillation of the proof mass. In step 460 the scale factor of the accelerometer is calculated based on the amplitude and frequency of the calibration signal and the maximum frequency response of the resonant element. The acceleration of the proof mass can be calculated based on the amplitude and frequency of the calibration signal. In step 470 the calculated scale factor is stored and the calibration signal is no longer applied to the actuation electrodes.

A particular advantage of the process set out in FIG. 6 is that it can be carried out automatically and/or periodically, while the accelerometer is in use. It is not necessary to remove the accelerometer to a testing facility or even to stop taking measurements using the accelerometer. By choosing a frequency for the calibration signal that is much higher than the frequency of variations in the measurand, frequency shifts due to the calibration signal can be extracted using a high pass filter or another spectral analysis tool and the measurand of interest, such as specific gravity, can be continually monitored.

Figure 7:
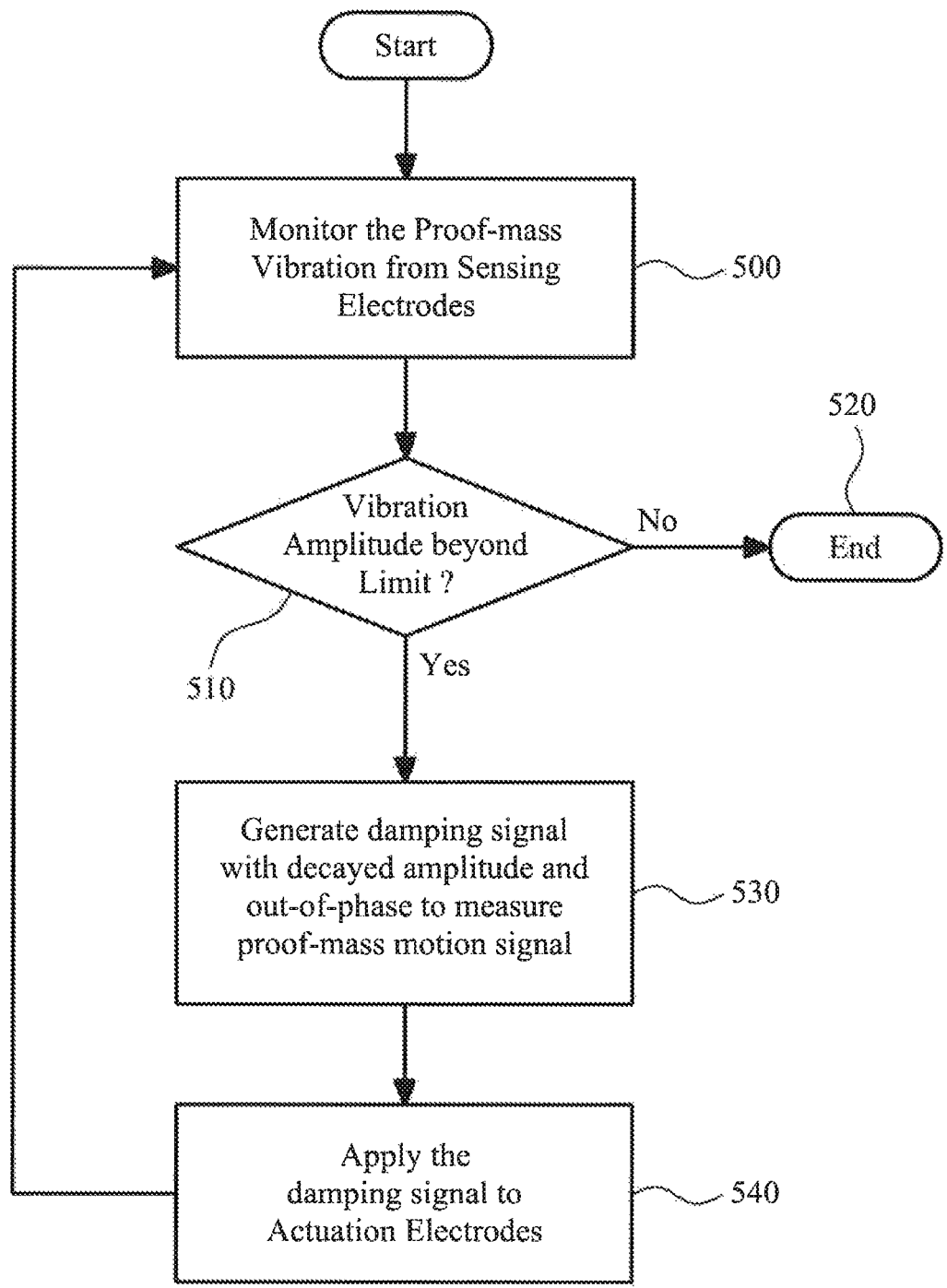
FIG. 7 illustrates a damping process using the arrangement of electrodes shown in FIG. 9.

FIG. 7 illustrates how the sensing and actuation electrodes can be used to provide active damping of the proof mass after it has undergone a shock. In a first step 500, signals from the sensing electrode are monitored and compared with a threshold amplitude limit. If the amplitude of the signal from the sensing electrode 28 does not exceed the threshold amplitude limit, then the sensor is considered to be operating under normal conditions in which reliable acceleration measurements can be made and no damping is required. This determination is illustrated as steps 510 and 520. If it is determined in step 510 that the amplitude of the signal from the sensing electrode 28 does exceed the threshold amplitude limit, then in step 530 a damping signal is generated. The damping signal is out of phase with the signal from the sensing electrode in order to retard the motion of the proof mass. The amplitude of the damping signal may decay with time over a predetermined duration. In step 540 the damping signal is applied to the actuation electrodes 16, 17, 18, 19 to retard the motion of the proof mass. After the damping signal has been fully applied, the process returns to step 500 to determine if further damping is required. In other configurations, a continuous feedback signal may be applied to the proof mass to provide a constant damping force in the absence of an external shock.

The damping process illustrated in FIG. 7 can be carried out continuously or periodically during operation of the sensor. The process may be carried out automatically, without requiring any operator input.

In addition to applying time varying signals to the actuation electrodes, a static DC bias may be applied to one or both of the actuation or sensing electrodes. A static DC bias voltage will displace the proof mass and so apply a constant force on the resonant element. The constant force on the resonant element results in a constant stress on the resonant element which alters its resonant behavior. In particular, the resonant element may be less sensitive to temperature variations and be more sensitive to acceleration of the proof mass when pre-stressed in this way.

The provision of electrodes on the substrate adjacent to the proof mass allows for automatic sensor testing and calibration to be performed without the need to place the sensor on a separate inertial platform. By applying DC and AC signals to the substrate electrode or electrodes, properties of the resonant sensor can be tested, such as the scale factor, linear dynamic range and bandwidth. The resonant sensor can therefore operate more reliably for long periods, without requiring the sensor to be taken out of service for testing and re-calibration. This can lead to significant costs savings in some applications, such as gravity sensing in oil and gas bores.

Although the invention has been described with reference to one particular resonant sensor topology and a particular form of substrate electrodes, it should be clear that other topologies may be used and other forms of electrode may be used. For example, the sensor may comprise a plurality of resonant elements. The substrate electrodes may not be comb electrodes requiring a corresponding electrode on the proof mass, but may simply be positioned adjacent to the proof mass.

The invention claimed is:

1. A resonant sensor comprising:
a substrate;
a proof mass suspended from the substrate to allow for relative movement between the proof mass and the substrate along at least one sensitive axis;
at least one resonant element coupled to the proof mass;
an electrode assembly adjacent to the at least one resonant element;
a drive and sense circuitry connected to the electrode assembly configured to drive the electrode assembly to cause the at least one resonant element to resonate, wherein a measure of acceleration of the proof mass a can be determined from changes in a resonant behavior of the at least one resonant element;
a substrate electrode on the substrate, adjacent to the proof mass; and
an electric circuitry connected to the substrate electrode configured to apply a voltage to the substrate electrode providing an electrostatic force on the proof mass along the first sensitive axis.

2. The resonant sensor according to claim 1, wherein the electric circuitry is configured to apply an alternating calibration signal to the substrate electrode to drive the proof mass at a calibration frequency, wherein the drive and sense circuitry is configured to use the resonant behavior of the resonant element to the calibration signal to calibrate the resonant sensor.

3. The resonant sensor according to claim 2, wherein the calibration frequency is lower than a fundamental resonant frequency of the at least one resonant element.

4. The resonant sensor according to claim 1, wherein the electric circuitry is configured to apply a DC biasing voltage to the substrate electrode.

5. The resonant sensor according to claim 1, further comprising at least one additional electrode on the substrate, adjacent to the proof mass, wherein the electric circuitry is configured to apply a damping signal to the substrate electrode or the at least one additional electrode.

6. The resonant sensor according to claim 5, wherein the substrate electrode and the additional electrode are connected through a closed-loop feedback control circuit.

7. The resonant sensor according to claim 1, wherein the substrate electrode is a comb electrode.

8. The resonant sensor according to claim 1, further comprising a proof mass electrode on the proof mass.

9. The resonant sensor according to claim 1, wherein the proof mass, the substrate and the resonant element are formed from silicon.

10. The resonant sensor according to claim 1, wherein the resonant sensor is a single axis gravity sensor.

11. A method of calibrating a resonant sensor, the resonant sensor comprising a substrate, a proof mass suspended from the substrate to allow for relative movement between the proof mass and the substrate along at least one sensitive axis, at least one resonant element coupled to the proof mass, an electrode assembly adjacent to the at least one resonant element, a drive and sense circuitry connected to the electrode assembly configured to drive the electrode assembly to cause the at least one resonant element to resonate, and a calibration electrode on the substrate, adjacent to the proof mass and configured to provide an electrostatic force on the proof mass along a first sensitive axis when a voltage is applies to the calibration electrode, wherein a measure of acceleration of the proof mass along to first sensitive axis can be determined from changes in a resonant behavior of the at least one resonant element; the method comprising:
applying an alternating calibration signal to the calibration electrode to drive the proof mass along the first sensitive axis at a calibration frequency, measuring a response of the resonant element to the calibration signal, calibrate the resonant sensor based on the response of the resonant element to the calibration signal.

12. The method according to claim 11, comprising recording a maximum frequency shift of a resonant frequency of the resonant element in response to the calibration signal.

13. The method according to claim 11, further comprising applying a DC bias voltage to the calibration electrode.

14. A method of operating a resonant sensor, the resonant sensor comprising a substrate, a proof mass suspended from the substrate to allow for relative movement between the proof mass and the substrate along at least one sensitive axis, at least one resonant element coupled to the proof mass, an electrode assembly adjacent to the at least one resonant element, a drive and sense circuitry connected to the electrode assembly configured to drive the electrode assembly to cause the at least one resonant element to resonate, wherein a measure of acceleration of the proof mass along a first sensitive axis can be determined from changes in a resonant behavior of the at least one resonant element, and a biasing electrode on the substrate, adjacent to the proof mass and configured to provide an electronic force on the proof mass along the first sensitive axis when a voltage is applied to the biasing electrode; the method comprising:

applying a DC bias voltage to the biasing electrode to stress the resonant element, and applying an AC drive voltage to the electrode assembly to drive the resonant element at a resonant frequency.

15. A method of operating a resonant sensor, the resonant sensor comprising a substrate, a proof mass suspended from the substrate to allow for relative movement between the proof mass and the substrate along at least one sensitive axis, at least one resonant element coupled to the proof mass, an electrode assembly adjacent to the at least one resonant element, a drive and sense circuitry connected to the electrode assembly configured to drive the electrode assembly to cause the at least one resonant element to resonate, wherein a measure of acceleration of the proof mass along a first sensitive axis can be determined from changes in a resonant behavior of the at least one resonant element, and at least one detection electrode on the substrate, adjacent to the proof mass and at least one damping electrode on the substrate adjacent to the proof mass and configured to provide an electrostatic force on the proof mass along the first sensitive axis when a voltage is applied to the damping electrode; the method comprising:

measuring a motion of the proof mass based on a signal from the at least one detection electrode to provide a detection signal, and applying a damping voltage to the at least one damping electrode, the damping voltage being generated based on the detection signal.

16. The resonant sensor according to claim 2, wherein the electric circuitry is configured to apply a DC biasing voltage to the substrate electrode.

17. The resonant sensor according claim 2, further comprising at least one additional electrode on the substrate, adjacent to the proof mass, wherein the electric circuitry is configured to apply a damping signal to the substrate electrode or the at least one additional electrode.

18. The resonant sensor according to claim 17, wherein the substrate electrode and additional electrode are connected through a closed-loop feedback control circuit.

19. The resonant sensor according to claim 2, wherein the substrate electrode is a comb electrode.

20. The resonant sensor according to claim 2, further comprising a proof mass electrode on the proof mass.

* * * * *